United States Patent [19]
Cook et al.

[11] 3,817,562
[45] June 18, 1974

[54] CONNECTOR FOR PLASTIC TUBE

[75] Inventors: Roger J. Cook; Donald E. McGeachy, both of Highland, Mich.

[73] Assignee: Numatics, Incorporated, Highland, Mich.

[22] Filed: July 14, 1972

[21] Appl. No.: 271,923

[52] U.S. Cl............................ 285/238, 285/382.5
[51] Int. Cl.............................................. F16l 33/00
[58] Field of Search.......... 138/10.9, 155; 285/238, 285/259, 115, 174, 382.5, 382.4

[56] References Cited
FOREIGN PATENTS OR APPLICATIONS
705,031    3/1965    Canada............................ 285/238
705,373    3/1954    Great Britain..................... 285/238

*Primary Examiner*—James J. Gill
*Assistant Examiner*—Anthony V. Ciarlante
*Attorney, Agent, or Firm*—Barnes, Kisselle, Raisch & Choate

[57] ABSTRACT

A one-piece tube connector for plastic tubes having a tube receiving end to provide a sealing engagement and a locking engagement operating on the outer diameter of the tube to prevent accidental withdrawal and to allow pneumatic functioning with gas or liquid under pressure.

5 Claims, 2 Drawing Figures

PATENTED JUN 18 1974   3,817,562

CONNECTOR FOR PLASTIC TUBE

This invention relates to a tube connector and relates primarily to a connector for plastic tubes such as the flexible tubing made out of vinyl or nylon.

It is an object of the invention to provide a one-piece tube connector which can be utilized to connect flexible tubing in a pneumatic or hydraulic system without the need for any clamping or mechanical pressure devices.

It is a further object to provide a connector into which the tube may be rather easily pushed to the point that a workman will know when the tube is seated and be assured that it will be retained.

It is still a further object of the invention to provide a tube connector which eliminates leakage from possible distortion resulting from sharp bending of the tube outside the connector and also to provide a connector which is inexpensive and easily manufactured while providing a reliable leak-proof connector.

Other objects and features of the invention relating to the details of construction will be apparent in the following description and claims in which the best mode presently contemplated is set forth.

Drawings accompany the disclosure and the various types thereof may be briefly described as:

REFERRING TO THE DRAWINGS

Figure 1:
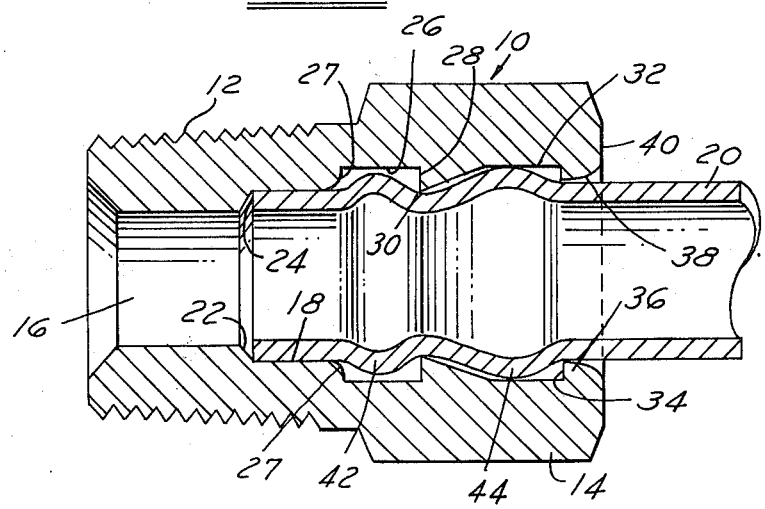
FIG. 1 is a cross-section of an assembled connector and tube.

The connector is shown at 10 having a tapered threaded end 12 for fastening into a valve housing, a cylinder or any other functioning part of a pneumatic or fluid system.

The outer end 14 of the connector is provided with a tube receiving recess which connects to a through central passage 16. The tube receiving recess comprises several portions, the first being an enlarged portion 18 having a diameter slightly less than the outside diameter of the plastic tube 20, this portion terminating in a shoulder 22 having radial walls which will serve as an abutment for the end 24 of the tube. It is not necessary that the end of the tube have a perfectly square cut so that it will seal against the abutment 22, this abutment serving only as a stop for the tube as an operator inserts it into the recess. The sealing will take place on the surface 18.

The tube receiving recess is enlarged at the end of the surface 18 to an annular groove 26 which terminates at one end in a bell-mouthed shoulder 27 and at the other end at an annular portion 28 which is toothed shaped in cross-section to provide a sharp edge 30. This portion 28 tapers to a second enlarged groove 32 which terminates at a shoulder 34 on an annular portion 36 which has a bell-mouthed configuration at 38 blending with the end surface 40 of the connector.

Figure 2:
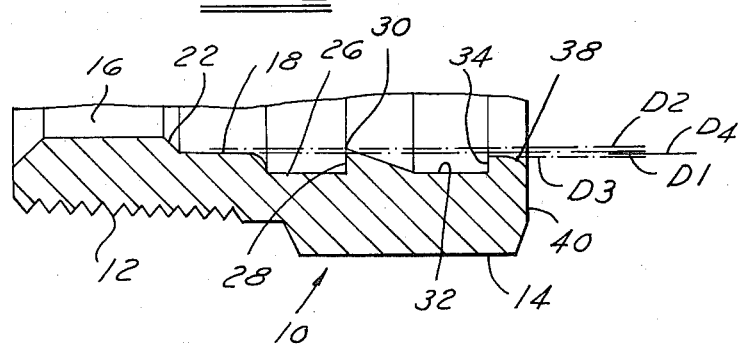
FIG. 2 is a partial view of a connector showing the relationship of the inside diameters of respective portions thereof.

The diameters of the above-described portions are critical. The diameter of the tube has been referenced in connection with the diameter of the sealing section 18. In FIG. 2, the diameter of the sealing portion 18 is designated at D1. The tube diameter on the other hand is designed as D4. The diameter of the sharp tooth portion 30 is designated as D2; and the diameter of the annular portion 36 at the mouth of the recess is designated as D3.

It will be seen from the drawing that the tube diameter D4 is slightly larger than the sealing diameter D1. The word "slightly" may be defined as a differential of 0.006 inch. The diameter D2 of the engagement tooth 30 is preferably 0.009 inch smaller than the diameter D1 and thus 0.015 inch smaller than the outside diameter of the tube. The diameter of the insertion opening of the portion 36, namely, diameter D3, is preferably slightly larger than the outside tube diameter by 0.003 inch. The diameter of the portions 26 and 32 is in the area of 0.042 inch larger than the diameter D2 of the sharp edge tooth 30.

When the tube 20 is inserted for a sealing and holding relationship with the connector 10, the end 24 is projected through the opening 38 and it will readily feed into this opening because of the bell mouth shape. Similarly, the angle on the annular portion 28 will feed the end of the tube past this portion and past the bell-mouthed shoulder 27 into the sealing portion 18. Because of the single tooth, the tube feeds readily into the unit and tends to buckle out at 42 into the recess 26 as the tube end is forced into the sealing portion 18. This provides a good contact with the sharp edge 30 which bites into the tube to hold it in place. The tube also, by this pressure, tends to force outwardly into the recess 32 in a bulging portion 44. The annular portion 36 which is slightly larger than the outer diameter of the tube, serves to stabilize the shape of the tube so that if there is a sharp bend outside of the connector, this guide opening will prevent the distortion of the tube from being transmitted to within the connector to disturb either the area at the edge 30 or at the portion 18.

It has been found that the one-piece connector with a single block toothed area provides an effective seal and connection for flexible tube, particularly in pneumatic systems under pressure and the insertion by the operator is independent of any additional pressure parts which would require skill to prevent damage. The operator simply inserts the tube until it hits the stop 22 and in this position it is sealed and locked.

We claim:

1. In combination, a plastic tube and a connector for anchoring said tube at one end in a sealed and functional relationship to permit the passage of fluid under pressure which comprises:

a. a flexible tube formed of plastic of the general character of vinyl and nylon having an unflexed normal outside diameter D4, b. a connector formed of a relatively hard material such as metal having an internal circular tube receiving recess extending generally axially therein with an integral stop seat with a generally radially inwardly extending wall adjacent one end thereof to abut one end of said tube when inserted therein, an integral axially extending generally cylindrical sealing surface within said tube receiving recess adjacent said stop seat having a diameter D1 slightly smaller than said diameter D4 to lie in sealing relation with the outside of said tube adjacent said one end thereof, an integral first annular portion within said tube receiving recess generally axially spaced from said sealing surface, said first annular portion being tooth-shaped in cross-section to project generally radially inwardly to grip the outer surface of said tube and having a minimum diameter D2 slightly smaller than diameter D4, an integral second annular portion generally axially spaced from said first annular portion and located adjacent the mouth of said circular tube receiving recess, said second annular portion extending generally radially inwardly and being coaxial with said generally cylindrical sealing surface to stabilize the shape of the portion of said tube within said tube receiving recess if there is a sharp bend in said tube outside said connector, and first and second generally annular recesses extending generally axially within said tube receiving recess and being located immediately adjacent said first annular portion on generally axially opposed sides thereof, said first and second generally annular recesses each having a diameter substantially larger than the outside diameter of said tube to permit said tube to expand into said recess on both sides of said first annular portion to retain said tube within said connector.

2. A combination as defined in claim 1 in which the minimum diameter of said second annular portion is slightly larger than the diameter of said tube and shaped in cross-section to bell outwardly to guide said tube as it is inserted into said tube receiving recess.

3. A combination as defined in claim 1 in which said first recess terminates at its inner end in a bell-mouth annulus adjacent said sealing surface to facilitate feeding said tube into engagement with said sealing surface.

4. A combination as defined in claim 1 wherein said tube receiving recess has therein only one annular portion with a tooth-shaped cross section to grip the outer surface of said tube.

5. A combination as defined in claim 2 wherein said tube receiving recess has therein only one annular portion with a tooth-shaped cross section to grip the outer surface of said tube.

* * * * *